United States Patent
Fox et al.

(10) Patent No.: US 11,429,933 B2
(45) Date of Patent: Aug. 30, 2022

(54) DYNAMIC MEETING AGENDA MODIFICATION BASED ON USER AVAILABILITY AND PREDICTED PROBABILITY ASSIMILATION

(71) Applicant: INTERNATIONAL BUSINESS MACHINES CORPORATION, Armonk, NY (US)

(72) Inventors: Jeremy R. Fox, Georgetown, TX (US); Lisa Seacat DeLuca, Baltimore, MD (US); Kelley Anders, East New Market, MD (US); Dana L. Price, Surf City, NC (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 16/564,724

(22) Filed: Sep. 9, 2019

(65) Prior Publication Data
US 2021/0073743 A1 Mar. 11, 2021

(51) Int. Cl.
*G06Q 10/10* (2012.01)
*G06Q 10/06* (2012.01)

(52) U.S. Cl.
CPC ... *G06Q 10/1095* (2013.01); *G06Q 10/06316* (2013.01); *G06Q 10/1091* (2013.01); *G06Q 10/1097* (2013.01)

(58) Field of Classification Search
CPC .................................................. G06Q 10/10
See application file for complete search history.

(56) References Cited

U.S. PATENT DOCUMENTS

| | | | |
|---|---|---|---|
| 7,974,871 | B2 | 7/2011 | Oral |
| 8,321,796 | B2 | 11/2012 | Lyle |
| 2004/0263636 | A1* | 12/2004 | Cutler ..................... H04N 7/15 348/211.12 |
| 2005/0050061 | A1 | 3/2005 | Karstens |
| 2006/0224430 | A1 | 10/2006 | Butt |

(Continued)

OTHER PUBLICATIONS

IBM, "Method for scheduling meetings with complex agendas and variable participation", An IP.com Prior Art Database Technical Disclosure, Original Publication Date: Apr. 30, 2009, IP.com No. IPCOM000182445D, IP.com Electronic Publication Date: Apr. 30, 2009, pp. 1-7.

(Continued)

*Primary Examiner* — Kurtis Gills
(74) *Attorney, Agent, or Firm* — Jordan T. Schiller

(57) ABSTRACT

A method, computer system, and computer program product for dynamic meeting agenda management are provided. The embodiment may include establishing a baseline set of agenda items prior to meeting commencement. The embodiment may also include identifying meeting participants based on actual real-time meeting attendance. The embodiment may further include monitoring an attendance and a participation of the meeting participants. The embodiment may also include identifying the agenda items that meet selection criteria using a coverage triggering mechanism. The embodiment may further include updating the order of the agenda items based on the agenda item that meet selection criteria first. The embodiment may also include displaying real-time meeting agenda items that meet the selection criteria.

17 Claims, 6 Drawing Sheets

(56) References Cited

U.S. PATENT DOCUMENTS

| | | | |
|---|---|---|---|
| 2007/0162322 A1 | 7/2007 | Shahine | |
| 2007/0288278 A1 | 12/2007 | Alexander | |
| 2009/0006608 A1* | 1/2009 | Gupta | G06Q 10/10 |
| | | | 709/224 |
| 2009/0006982 A1* | 1/2009 | Curtis | G06Q 10/10 |
| | | | 715/753 |
| 2009/0313299 A1* | 12/2009 | Bon | G06F 3/0481 |
| 2014/0164510 A1* | 6/2014 | Abuelsaad | G06Q 10/109 |
| | | | 709/204 |
| 2014/0200944 A1* | 7/2014 | Henriksen | G06Q 10/1095 |
| | | | 705/7.19 |
| 2016/0124593 A1 | 5/2016 | Joi | |
| 2019/0108493 A1* | 4/2019 | Nelson | G10L 15/26 |
| 2019/0340554 A1* | 11/2019 | Dotan-Cohen | |
| | | | G06Q 10/063112 |

OTHER PUBLICATIONS

White, "Ineffective Meetings Cost Companies Up to $283 Billion a Year (So Streamline Collaboration With These Tips)", INC.com, Productivity, https://www.inc.com/john-white/ineffective-meetings-cost-companies-up-to-283-billion-a-year-streamline-collaboration-with-these-tips.html, Accessed Sep. 3, 2019, pp. 1-16.

Mell et al., "The NIST Definition of Cloud Computing", National Institute of Standards and Technology, Special Publication 800-145, Sep. 2011, 7 pages.

* cited by examiner

DYNAMIC MEETING AGENDA MODIFICATION BASED ON USER AVAILABILITY AND PREDICTED PROBABILITY ASSIMILATION

BACKGROUND

The present invention relates, generally, to the field of computing, and more particularly to electronic meeting systems and meeting agenda modification.

An electronic meeting system is a type of computer software that enables users to collaborate on creating predictable and repeatable patterns of tasks required to achieve a goal. Users may utilize their own computer and can contribute to a shared object at the same time online. Although most electronic meeting systems provide some standard functionalities, they may differ in handling or managing specific objectives or tools associated with it. Many electronic meeting systems may interact with web conferencing systems that enables video screen sharing and voice conferencing. Modern electronic meeting systems may further organize the process of a meeting into an electronic agenda that can manage the structures of an entire meeting based on topics, time, and use of a particular tool. A host or a facilitator of a meeting may use said systems to invite participants. Agendas used in previous meetings with any updates may be stored to use as templates in the future.

SUMMARY

According to one embodiment, a method, computer system, and computer program product for dynamic meeting agenda management are provided. The embodiment may include establishing a baseline set of agenda items prior to meeting commencement. The embodiment may also include identifying meeting participants based on actual real-time meeting attendance. The embodiment may further include monitoring an attendance and a participation of the meeting participants. The embodiment may also include identifying the agenda items that meet selection criteria using a coverage triggering mechanism. The embodiment may further include updating the order of the agenda items based on the agenda item that meet selection criteria first. The embodiment may also include displaying real-time meeting agenda items that meet the selection criteria.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
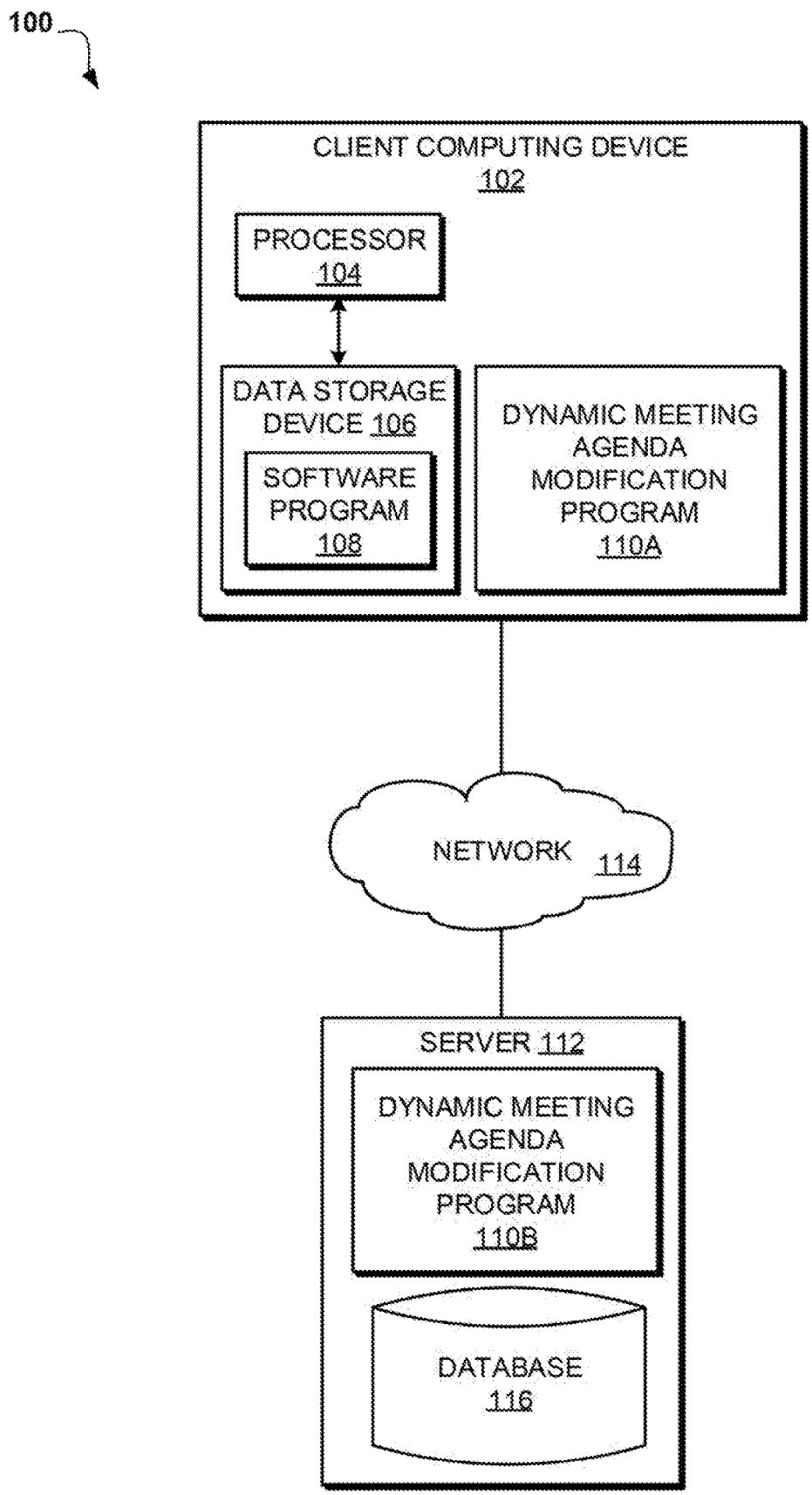
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to electronic meeting systems. The following described exemplary embodiments provide a system, method, and program product to dynamically and visually highlight the agenda items that are ready for review based on who is present amongst a set of subgroups of participants at a given time during a meeting and color code agenda items as the probability of conducting a review of said items based on the monitoring of a number of participants required to attend during a meeting. Therefore, the present embodiment has the capacity to improve the technical field of electronic meeting systems by maximizing the number of the agenda items covered or discussed during a meeting by confirming which items really need to be discussed based on a real-time monitored group of attendees at a specific time or session of the meeting.

As previously described, an electronic meeting system is a type of computer software that enables users to collaborate on creating predictable and repeatable patterns of tasks required to achieve a goal. Users may utilize their own computer and can contribute to a shared object at the same time online. Although most electronic meeting systems provide some standard functionalities, they may differ in handling or managing specific objectives or tools associated with it. Many electronic meeting systems may interact with web conferencing systems that enables video screen sharing and voice conferencing. Modern electronic meeting systems may further organize the process of a meeting into an electronic agenda that can manage the structures of an entire meeting based on topics, time, and use of a particular tool. A host or a facilitator of a meeting may use said systems to invite participants. Agendas used in previous meetings with any updates may be stored to use as templates in the future.

Larger meetings with multiple agenda items are complex to manage. Participant availability becomes increasingly challenging as the meeting time increases and agenda items grow in number. This presents an opportunity to manage the agenda dynamically based on who is in the meeting (on the phone, conference call, or video conference), as their agenda items come up during the meeting. The meeting moderator may struggle with these larger meetings, as people dynamically join and leave the meeting unannounced. As such, it may be advantageous to, among other things, implement a system capable of optimizing the scheduling, as well as notifying the participants of availability, in order to complete the next agenda item during a meeting such that the system may adapt to a real-time changes for all participants within a meeting and relates each agenda item to necessary attendees.

According to one embodiment, the present invention may determine a baseline set of meeting agenda items. In at least one other embodiment, the present invention may also automatically monitor meeting attendees joining or leaving and determine if the required number of attendees are present for a specific agenda item. The present invention may further define a coverage triggering mechanism based on a required number of attendees, criteria, and topic within a particular meeting agenda.

The present invention may be a system, a method, and/or a computer program product at any possible technical detail level of integration. The computer program product may include the the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for automatically adjusting electronic meeting agendas based on attendees availability and predicted probability assimilation.

Referring to FIG. 1, an exemplary networked computer environment 100 is depicted according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a dynamic meeting agenda modification program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a dynamic meeting agenda modification program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the dynamic meeting agenda modification program 110A, 110B may be a program capable of extracting key meeting agenda items from various files or data required for a specific task and defining criteria for each item of the agenda based on required number of attendees and such attendees' responsibilities or roles. The dynamic meeting agenda modification process is explained in further detail below with respect to FIG. 2.

Figure 2:
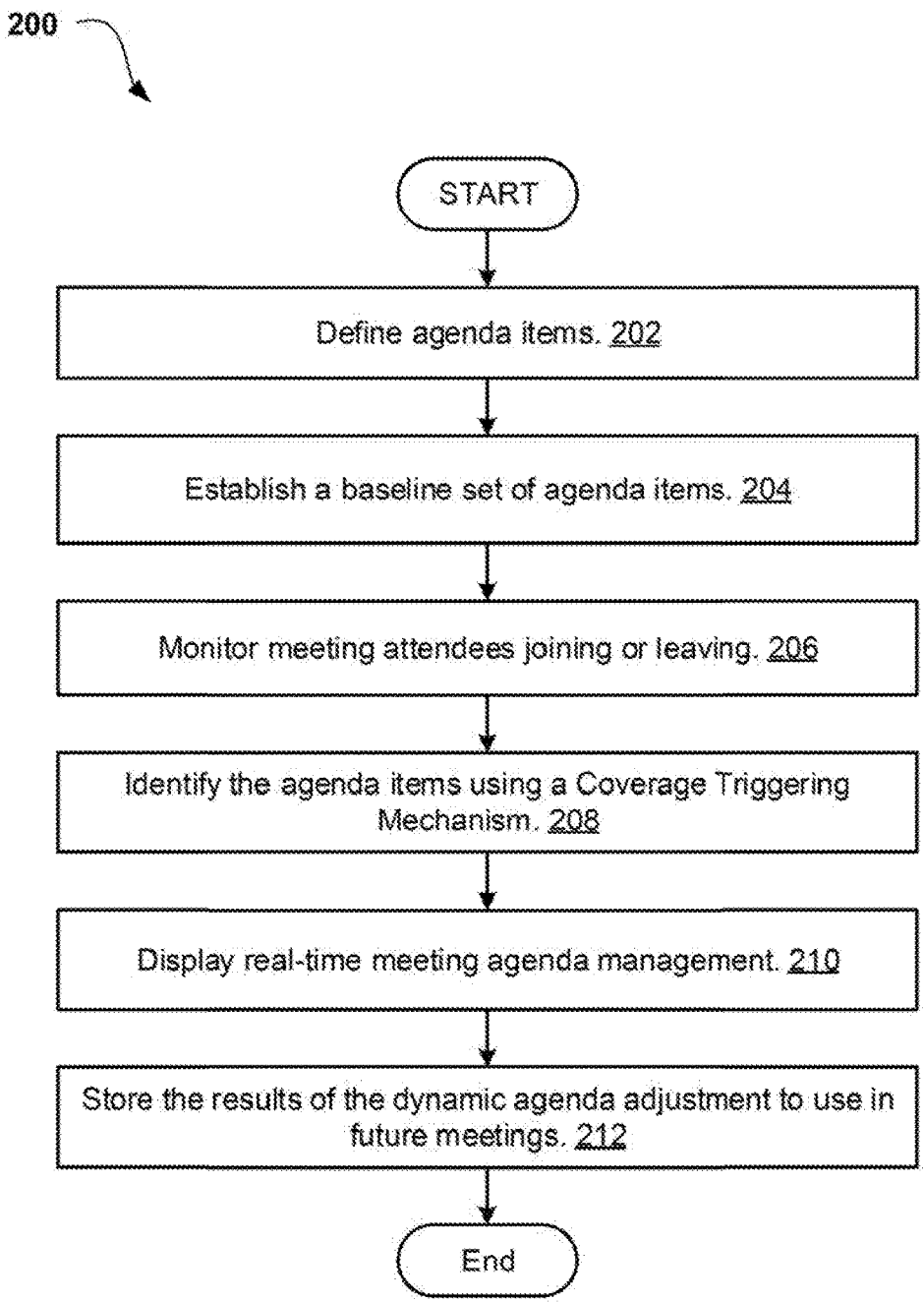
FIG. 2 is an operational flowchart illustrating a dynamic meeting agenda modification process according to at least one embodiment.

Referring to FIG. 2, an operational flowchart illustrating a dynamic meeting agenda modification process 200 is depicted according to at least one embodiment. At 202, the dynamic meeting agenda modification program 110A, 110B defines meeting agenda items. According to one embodiment, the dynamic meeting agenda modification program 110A, 110B may define meeting agenda items based on a meeting moderator's selection of topical agendas and an anticipated list of attendees for each agenda item and an anticipated time to fully cover each agenda item during a meeting. For example, if a user moderator wants to review five agenda items involving attendees from various business departments, the user moderator may upload a summary of key topics to be covered along with the planned list of key attendees for each key item. In at least one other embodiment, the dynamic meeting agenda modification program 110A, 110B may retrieve a similar meeting agenda from the database 116 and prompt a user to modify or update for an upcoming meeting agenda.

At 204, the dynamic meeting agenda modification program 110A, 110B establishes a baseline set of agenda items. According to one embodiment, the dynamic meeting agenda modification program 110A, 110B may establish a baseline set of agenda items based on a moderator's manually entered list of agenda items or an uploaded meeting invitation that contains key meeting topics and expected duration of discussion. For example, if a meeting invitation contains five agenda items and has several sub-items under each key item, the dynamic meeting agenda modification program 110A, 110B may ingest such sub-agenda items to generate a baseline set of agenda items. In at least one other embodiment, the dynamic meeting agenda modification program 110A, 110B may establish a baseline set of agenda items based on previous successful outcomes of previous meetings or a similar topical nature or automatically based on an API. For example, an API may have already established pre-configured key items for each meeting as such meeting items may repeatedly covered for consecutive meetings of the same nature.

At 206, the dynamic meeting agenda modification program 110A, 110B monitors if meeting attendees are leaving or joining. As previously described, the dynamic meeting agenda modification program 110A, 110B may have an established baseline set of agenda items with a planned list of attendees necessary to cover each meeting agenda item. For example, if an agenda item A required employees X, Y and Z from the accounting department to attend, the dynamic meeting agenda modification program 110A, 110B may need to determine if the employees X, Y, and Z are present and currently participating in the meeting to cover or discuss the agenda item A. According to one embodiment, the dynamic meeting agenda modification program 110A, 110B may monitor each required attendee joining the meeting and check the time when each attendee left the online meeting. Once the dynamic meeting agenda modification program 110A, 110B identifies all attendees required for each agenda item and determines the time when each attendee joined or left, the dynamic meeting agenda modification program 110A, 110B may determine which agenda items from the agenda items list are ready to be covered.

At 208, the dynamic meeting agenda modification program 110A, 110B identifies the agenda items using a coverage triggering mechanism. According to one embodiment, the dynamic meeting agenda modification program 110A, 110B may define a coverage triggering mechanism based on selection criteria and planned participants in a meeting for any agenda item that must be covered. For example, if three managers must be present for a meeting agenda item to be covered, then all three of the managers must be currently present in the conference call or video conference meeting for the coverage triggering mechanism to trigger. In at least one embodiment, the dynamic meeting agenda modification program 110A, 110B may utilize a voice recognition technique and a face recognition technique to determine if a planned participant is actually present in a conference call or video conference meeting. The dynamic meeting agenda modification program 110A, 110B may further determine whether an assigned presenter or a delegate is present in a meeting. Once the mandatory attendees and the presenter are confirmed to be present, the dynamic meeting agenda modification program 110A, 110B may prompt a moderator to start the discussion of the agenda item to which the attendees and the presenter were assigned. the dynamic meeting agenda modification program 110A, 110B may also determine a quorum of planned participants related to each agenda item. For example, if the dynamic meeting agenda modification program 110A, 110B is preconfigured by a moderator that a quorum required for the meeting agenda in the above example is 2 managers out of 3 managers, the dynamic meeting agenda modification program 110A, 110B may determine that the agenda item is ready to be covered. In at least one other embodiment, the dynamic meeting agenda modification program 110A, 110B may specify a parameter for each team based on the total number of team members. For instance, if an agenda item needs to be covered by a finance team and the finance team has 10 team members that can participate in discussion of the agenda item, the dynamic meeting agenda modification program 110A, 110B may adjust the quorum, for example, to 35% or 50%.

At 210, the dynamic meeting agenda modification program 110A, 110B displays a real-time meeting agenda management. According to one embodiment, the dynamic meeting agenda modification program 110A, 110B may utilize a visual indicator to display who is on the call or in the video by automatically shifting agenda items. The dynamic meeting agenda modification program 110A, 110B may visually mark completed agenda items in italicized text and may gray out agenda items until the selection criteria (i.e. a quorum) is met such that a system or a moderator does not need to indicate or take action to ask, for example, "is anyone from Agenda item #2 here right now?". The dynamic meeting agenda modification program 110A, 110B may further color code each agenda item based on who is on the line. The dynamic meeting agenda modification program 110A, 110B may also show a confidence score on whether an agenda item will be covered or skipped based on continuous monitoring of attendees leaving or joining and determining whether a quorum is met within a pre-configured time window. The dynamic meeting agenda modification program 110A, 110B may also show a predicted time that an agenda item may be covered. For example, if each agenda item is given 15 minutes for discussion and item B does not have a quorum and item C does, then the dynamic meeting agenda modification program 110A, 110B may show that item C has an estimated start time of 15 minutes after item A has started. In yet another embodiment, the dynamic meeting agenda modification program 110A, 110B may represent icons next to an agenda item that mimics the presence or absence of group members.

At 212, the dynamic meeting agenda modification program 110A, 110B stores the results of the dynamic meeting agenda adjustment for future meetings. According to one embodiment, the dynamic meeting agenda modification program 110A, 110B may capture the results of the above agenda items management to learn for the future to populate baseline agenda items in future meetings with the same agenda content. For example, the dynamic meeting agenda modification program 110A, 110B may store in the database 116, a quorum for each agenda meeting, estimated time of each topic and the actual time spend on covering a given topic or agenda item.

Figure 3:
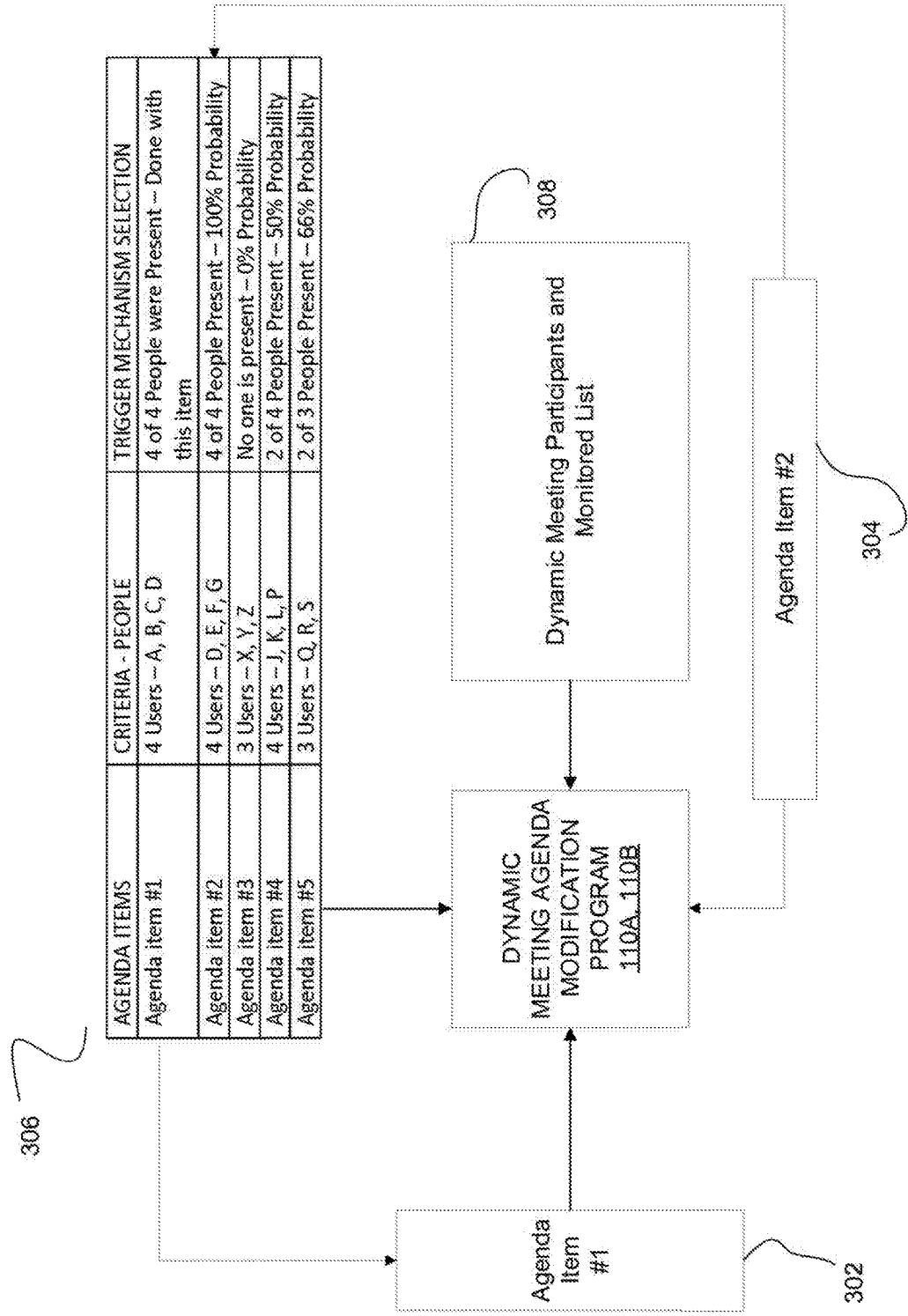
FIG. 3 is a block diagram illustrating an exemplary agenda modification process according to at least one embodiment.

Referring now to FIG. 3, a block diagram illustrating an exemplary agenda modification process is depicted according to at least one embodiment. According to one embodiment, the dynamic meeting agenda modification program 110A, 110B may monitor a planned list of meeting participants 308 and update the coverage triggering mechanism selection 306 when a new participant joins or leaves the meeting. For example, agenda item #1 302, the first agenda item in the coverage triggering mechanism selection 306, requires 4 users to start the discussion and 4 of 4 people were present. The dynamic meeting agenda modification program 110A, 110B may start covering the agenda item #1 302 and the dynamic meeting agenda modification program 110A, 110B may change the color code in the coverage triggering mechanism selection 306. If the next agenda item to be covered is agenda item #2 (illustrated as agenda item #2 304) and all the required users are present, then the dynamic meeting agenda modification program 110A, 110B may color code the agenda item #2 304 in green, indicating that the agenda item #2 304 is ready to be covered. While users are discussing the agenda item #1 302 and the agenda item #2 304, the dynamic meeting agenda modification program 110A, 110B may monitor other users required for next agenda items (i.e. agenda item #3, agenda item #4, agenda item #5) and adjust the color code initially assigned to each agenda item.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the dynamic meeting agenda modification program 110A, 110B may utilize an additional notification technique that alerts subgroups further on an agenda item when the likelihood of the agenda item being presented is modified by the attendance or lack of attendance of other subgroups. The dynamic meeting agenda modification program 110A, 110B may also adjust a quorum status of a meeting group by allowing a user to manually mark attendance and clicking on an agenda. Alternatively, the present invention may be used in place of buzzers at restaurants. For example, when there is a party arriving for dinner reservations, the system may alert the host or hostess when the number of people present is a quorum allowing groups to be seated before others if the quorum arrives first.

Figure 4:
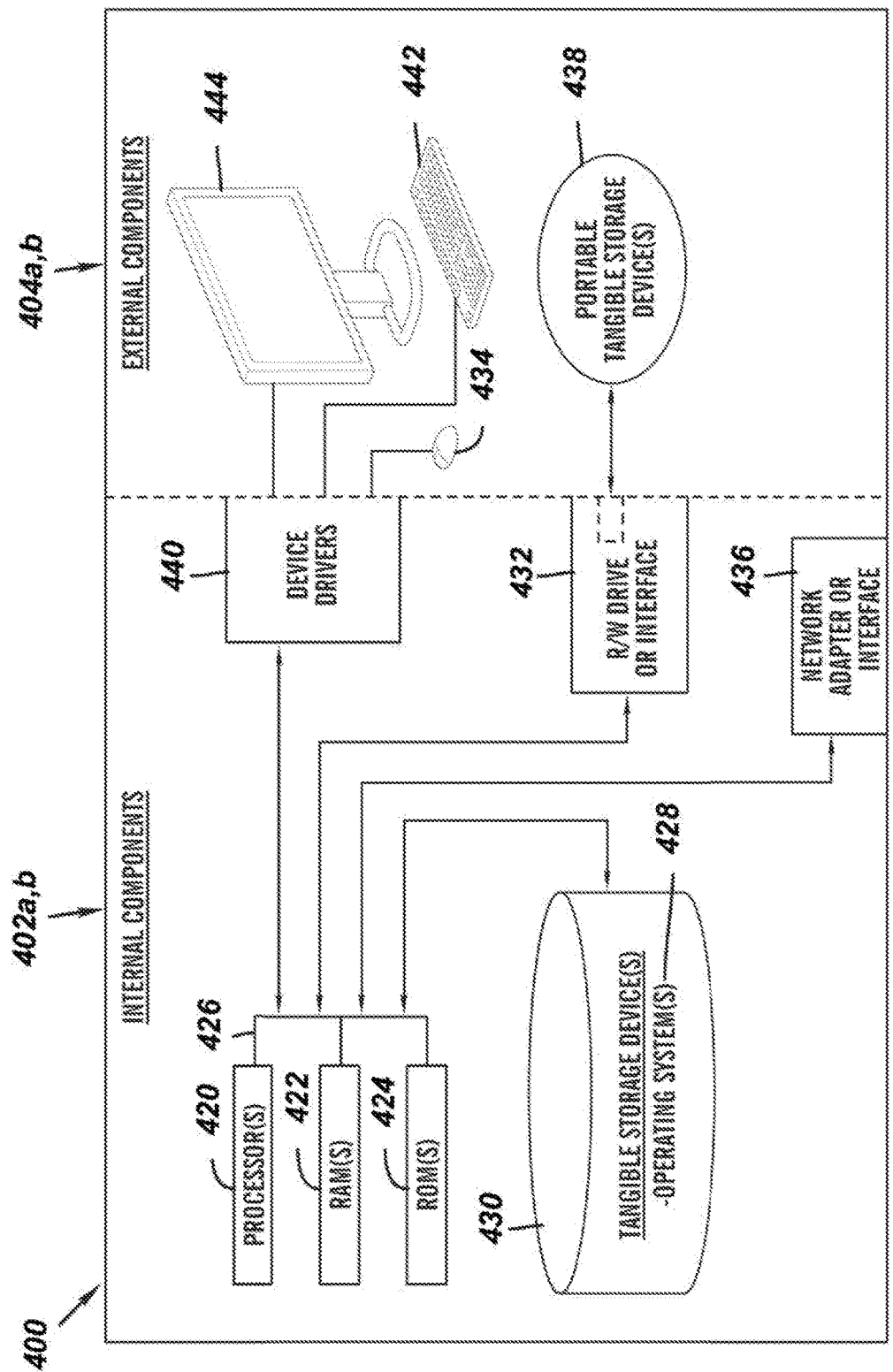
FIG. 4 is a block diagram of internal and external components of computers and servers depicted in FIG. 1 according to at least one embodiment.

FIG. 4 is a block diagram of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smartphone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the dynamic meeting agenda modification program 110A in the client computing device 102 and the dynamic meeting agenda modification program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as a dynamic meeting agenda modification program 110A, 110B can be stored on one or more of the respective portable computer-readable tangible storage devices 438, read via the respective R/W drive or interface 432 and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the dynamic meeting agenda modification program 110A in the client computing device 102 and the dynamic meeting agenda modification program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the dynamic meeting agenda modification program 110A in the client computing device 102 and the dynamic meeting agenda modification program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
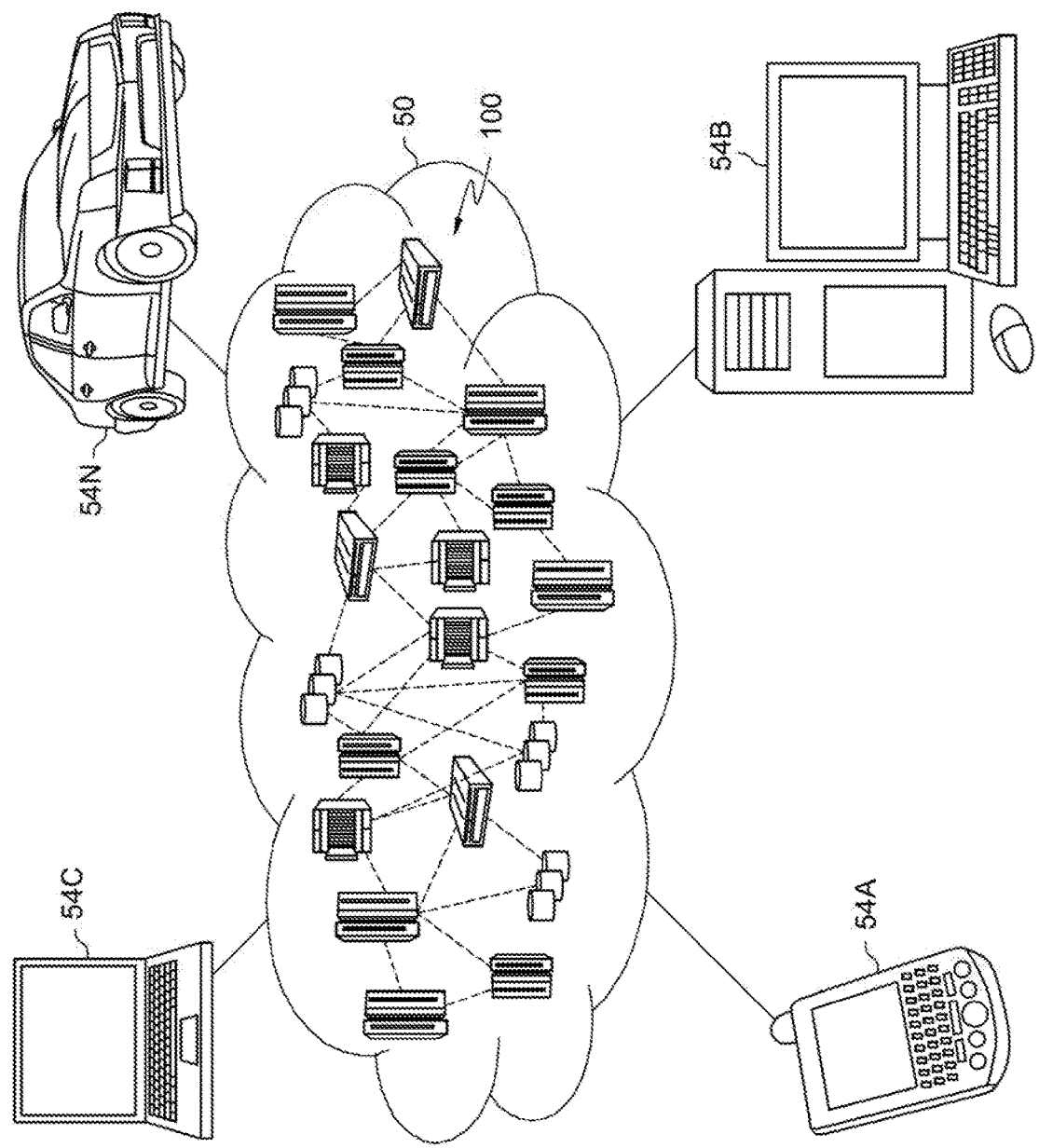
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
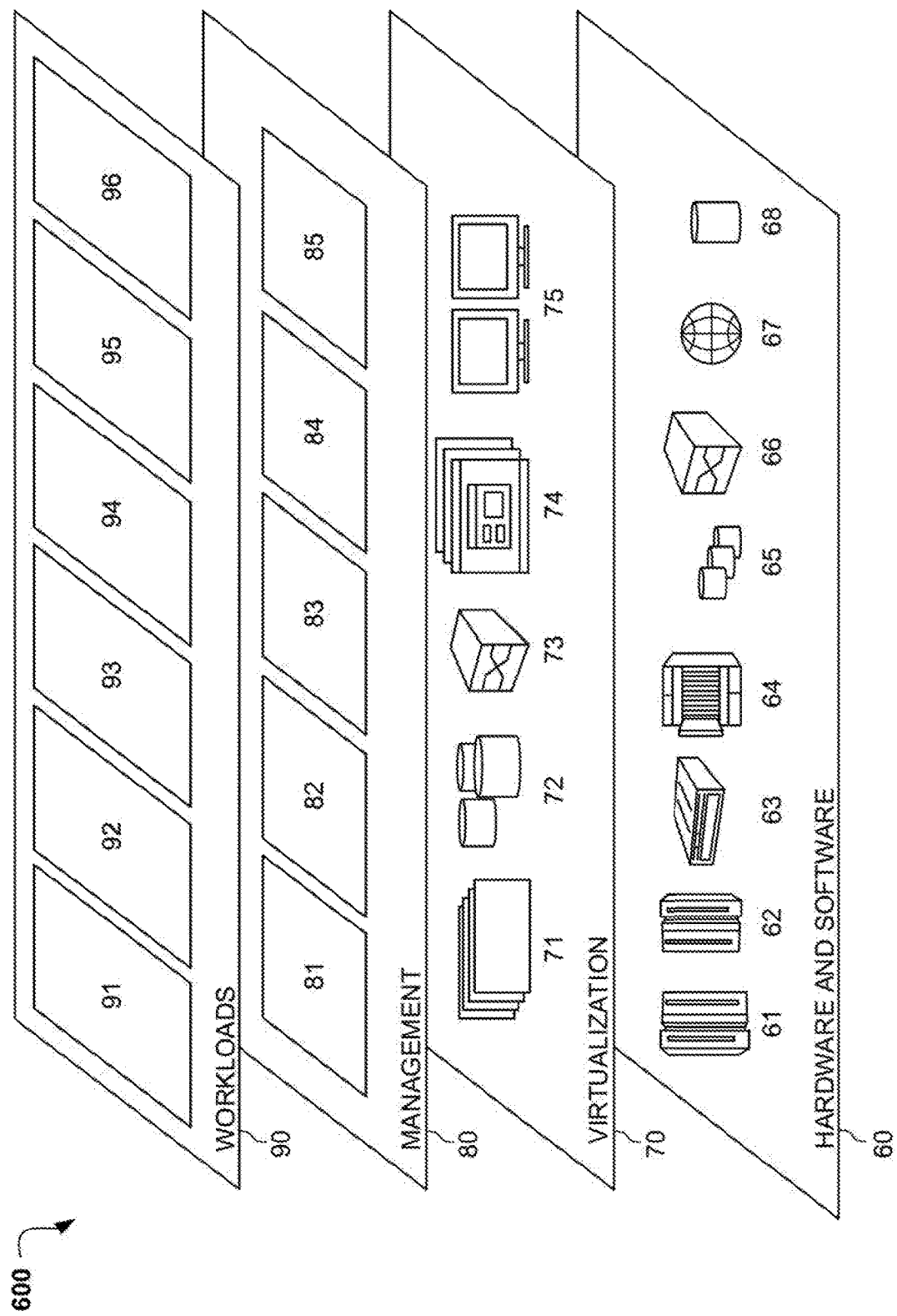
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic meeting agenda modification 96. Dynamic meeting agenda modification 96 may relate to visually highlighting the agenda items that are ready for review based on who is present amongst a set of subgroups of participants at a given time during a meeting.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for dynamic meeting agenda management, the method comprising:
    establishing a baseline set of agenda items prior to meeting commencement;
    identifying meeting participants based on actual real-time meeting attendance;
    monitoring an attendance and a participation of the meeting participants, wherein monitoring comprises using a voice recognition technique;
    identifying the agenda items that meet selection criteria using a coverage triggering mechanism;
    updating the order of the agenda items based on the agenda item that meet selection criteria first;
    highlighting, in real-time, the agenda items that meet the selection criteria and are ready for review, wherein a confidence score on whether one or more of the highlighted agenda items will be covered or skipped based on continuous monitoring of the attendance of the meeting participants amongst a subgroup of participants at a given time during the meeting;
    color-coding the agenda items based on the likelihood of the agenda items being presented at the meeting, and further based on changes in the attendance of the meeting participants required for the agenda item to be reviewed; and
    alerting the subgroup of participants during the meeting, using a notification technique, when likelihood of the agenda item being presented is modified by attendance or lack of attendance.

2. The method of claim 1, wherein the selection criteria comprise a minimum number of meeting participants required and a list of all meeting participants.

3. The method of claim 1, wherein the baseline set of agenda items are moderator-generated based on an agenda listed in a meeting invitation or from a manually entered list.

4. The method of claim 1, wherein the baseline set of agenda items are system-generated based on previous successful outcomes of the previous meeting of like topical nature.

5. The method of claim 1, further comprising:
    shifting, automatically, displayed agenda items based on determination of who is on the call or present in the meeting; and
    color-coding agenda items based on meeting participants currently in attendance in the meeting.

6. The method of claim 1, further comprising:
    storing the list of the meeting agenda items and results of the meeting agenda items that meet the selection criteria in a database; and
    retrieving the stored list of the meeting agenda items and the results of the meeting agenda items against the selection criteria to establish a baseline agenda item for future similar meetings.

7. A computer system for dynamic meeting agenda management, the computer system comprising:
    one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
        establishing a baseline set of agenda items prior to meeting commencement;
        identifying meeting participants based on actual real-time meeting attendance;
        monitoring an attendance and a participation of the meeting participants, wherein monitoring comprises using a voice recognition technique;
        identifying the agenda items that meet selection criteria using a coverage triggering mechanism;
        updating the order of the agenda items based on the agenda item that meet selection criteria first;
        highlighting, in real-time, the agenda items that meet the selection criteria and are ready for review, wherein a confidence score on whether one or more of the highlighted agenda items will be covered or skipped based on continuous monitoring of the attendance of the meeting participants amongst a subgroup of participants at a given time during the meeting;
        color-coding the agenda items based on the likelihood of the agenda items being presented at the meeting, and further based on changes in the attendance of the meeting participants required for the agenda item to be reviewed; and
        alerting the subgroup of participants during the meeting, using a notification technique, when likelihood of the agenda item being presented is modified by attendance or lack of attendance.

8. The computer system of claim 7, wherein the selection criteria comprise a minimum number of meeting participants required and a list of all meeting participants.

9. The computer system of claim 7, wherein the baseline set of agenda items are moderator-generated based on an agenda listed in a meeting invitation or from a manually entered list.

10. The computer system of claim 7, wherein the baseline set of agenda items are system-generated based on previous successful outcomes of the previous meeting of like topical nature.

11. The computer system of claim 7, further comprising:
    shifting, automatically, displayed agenda items based on determination of who is on the call or present in the meeting; and
    color-coding agenda items based on meeting participants currently in attendance in the meeting.

12. The computer system of claim 7, further comprising:
    storing the list of the meeting agenda items and results of the meeting agenda items that meet the selection criteria in a database; and
    retrieving the stored list of the meeting agenda items and the results of the meeting agenda items against the selection criteria to establish a baseline agenda item for future similar meetings.

13. A computer program product for dynamic meeting agenda management, the computer program product comprising:
    one or more computer-readable tangible storage media and program instructions stored on at least one of the one or more tangible storage media, the program instructions executable by a processor of a computer to perform a method, the method comprising:
        establishing a baseline set of agenda items prior to meeting commencement;
        identifying meeting participants based on actual real-time meeting attendance;
        monitoring an attendance and a participation of the meeting participants, wherein monitoring comprises using a voice recognition technique;

identifying the agenda items that meet selection criteria using a coverage triggering mechanism;
updating the order of the agenda items based on the agenda item that meet selection criteria first;
highlighting displaying, in real-time, the agenda items that meet the selection criteria and are ready for review, wherein a confidence score on whether one or more of the highlighted agenda items will be covered or skipped based on continuous monitoring of the attendance of the meeting participants amongst a subgroup of participants at a given time during the meeting;
color-coding the agenda items based on the likelihood of the agenda items being presented at the meeting, and further based on changes in the attendance of the meeting participants required for the agenda item to be reviewed; and
alerting the subgroup of participants during the meeting, using a notification technique, when likelihood of the agenda item being presented is modified by attendance or lack of attendance.

14. The computer program product of claim 13, wherein the selection criteria comprise a minimum number of meeting participants required and a list of all meeting participants.

15. The computer program product of claim 13, wherein the baseline set of agenda items are moderator-generated based on an agenda listed in a meeting invitation or from a manually entered list.

16. The computer program product of claim 13, wherein the baseline set of agenda items are system-generated based on previous successful outcomes of the previous meeting of like topical nature.

17. The computer program product of claim 13, further comprising:
shifting, automatically, displayed agenda items based on determination of who is on the call or present in the meeting; and
color-coding agenda items based on meeting participants currently in attendance in the meeting.

\* \* \* \* \*